US007926863B2

(12) United States Patent
Hanna et al.

(10) Patent No.: US 7,926,863 B2
(45) Date of Patent: Apr. 19, 2011

(54) POWER HINGE MECHANISM USING A PUSH-PULL CABLE

(75) Inventors: Ronald J. Hanna, East Jordan, MI (US); Kevin J. Hopp, Gaylord, MI (US); James Allen, Bellaire, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 0 days.

(21) Appl. No.: 12/183,833

(22) Filed: Jul. 31, 2008

(65) Prior Publication Data

US 2009/0102225 A1 Apr. 23, 2009

Related U.S. Application Data

(60) Provisional application No. 60/952,901, filed on Jul. 31, 2007.

(51) Int. Cl.
*B62D 25/10* (2006.01)

(52) U.S. Cl. ....................................... 296/76; 296/100.1

(58) Field of Classification Search .................... 296/76, 296/146.11, 100.1; 16/324, 326, 287, 277, 16/278; 49/356, 357, 139, 140
See application file for complete search history.

(56) References Cited

U.S. PATENT DOCUMENTS

| | | | | |
|---|---|---|---|---|
| 4,739,585 | A * | 4/1988 | Pickles | 49/280 |
| 4,823,059 | A * | 4/1989 | Compeau et al. | 318/454 |
| 5,794,381 | A * | 8/1998 | Rizkovsky | 49/139 |
| 6,119,543 | A * | 9/2000 | Webb | 74/502.4 |
| 6,181,094 | B1 * | 1/2001 | Menke | 318/434 |
| 6,270,147 | B1 * | 8/2001 | Butler et al. | 296/146.4 |
| 6,283,530 | B1 * | 9/2001 | Hollerbach | 296/76 |
| 6,382,701 | B1 * | 5/2002 | Langguth et al. | 296/107.01 |
| 7,059,653 | B2 * | 6/2006 | Oberheide | 296/146.1 |
| 7,506,556 | B2 * | 3/2009 | Ritter et al. | 74/89.2 |
| 2009/0173186 | A1 * | 7/2009 | Spurr et al. | 74/810.1 |

* cited by examiner

*Primary Examiner* — Dennis H Pedder

(74) *Attorney, Agent, or Firm* — Gifford, Krass, Sprinkle, Anderson & Citkowski, P.C.; Kevin S. MacKenzie; Dean B. Watson

(57) ABSTRACT

A powered deck lid assembly includes a deck lid connected to a hinge mechanism for pivotal movement between open and closed positions relative to a trunk opening. A cable is associated with the deck lid and is lineally actuable pivotally moving the deck lid between the open and closed positions. The cable may be a push-pull cable.

11 Claims, 7 Drawing Sheets

POWER HINGE MECHANISM USING A PUSH-PULL CABLE

REFERENCE TO RELATED APPLICATIONS

This application claims priority to U.S. provisional patent application No. 60/952,901, which was filed Jul. 31, 2007 and is incorporated herein by reference in its entirety.

FIELD OF THE INVENTION

The invention relates to power deck lid assemblies for motor vehicles.

BACKGROUND OF THE INVENTION

Power deck lid assemblies are generally known in the art and may include various mechanisms such as push rods and drum mechanisms to open and close structures coupled to the hinge. Such power hinge mechanisms are typically bulky and occupy valuable packaging space of an assembly associated with a vehicle. Additionally the prior art mechanisms are complicated and have numerous parts that may increase the cost of the powered hinge mechanisms.

There is, therefore, a need in the art for a powered hinge mechanism that has improved packaging with sufficient performance such that the system can be more readily adapted across multiple vehicle platforms. There is also a need in the art for a powered hinge mechanism that will easily allow for manual use as well as powered use without significant forces applied to mechanism. There is also a need in the art for a powered hinge mechanism that is lowers the forces applied to the mounting points and actuator associated with a power hinge mechanism. There is a need in the art for a power hinge mechanism having less complicated assemblies with improved performance parts.

SUMMARY OF THE INVENTION(S)

In one aspect, there is disclosed a powered deck lid assembly that includes a deck lid connected to a hinge mechanism for pivotal movement between open and closed positions relative to a trunk opening. A push-pull cable is attached at a first end to the hinge mechanism. The push-pull cable is movable lineally and pivotally moves the deck lid between the open and closed positions.

In another aspect, there is disclosed a powered deck lid assembly that includes a deck lid connected to a hinge mechanism for pivotal movement between open and closed positions relative to a trunk opening. A cable is associated with the deck lid and is lineally actuable pivotally moving the deck lid between the open and closed positions.

In another aspect, there is disclosed a powered deck lid assembly that includes a deck lid connected to a hinge mechanism for pivotal movement between open and closed positions relative to a trunk opening. A cable is associated with the deck lid and applies a pushing force to open the deck lid from a closed position and applies a pulling force closing the deck lid from the open position.

In another aspect, there is disclosed a powered deck lid assembly that includes a deck lid connected to a hinge mechanism for pivotal movement between open and closed positions relative to a trunk opening. A push-pull cable including a conduit is attached at a first end to the hinge mechanism. The push-pull cable is movable lineally and pivotally moves the deck lid between the open and closed positions. The conduit absorbs forces applied to the deck lid and transmitted to the push-pull cable lessening an applied force on an actuator attached to the push-pull cable.

DETAILED DESCRIPTION OF THE PREFERRED EMBODIMENTS

Figure 1:
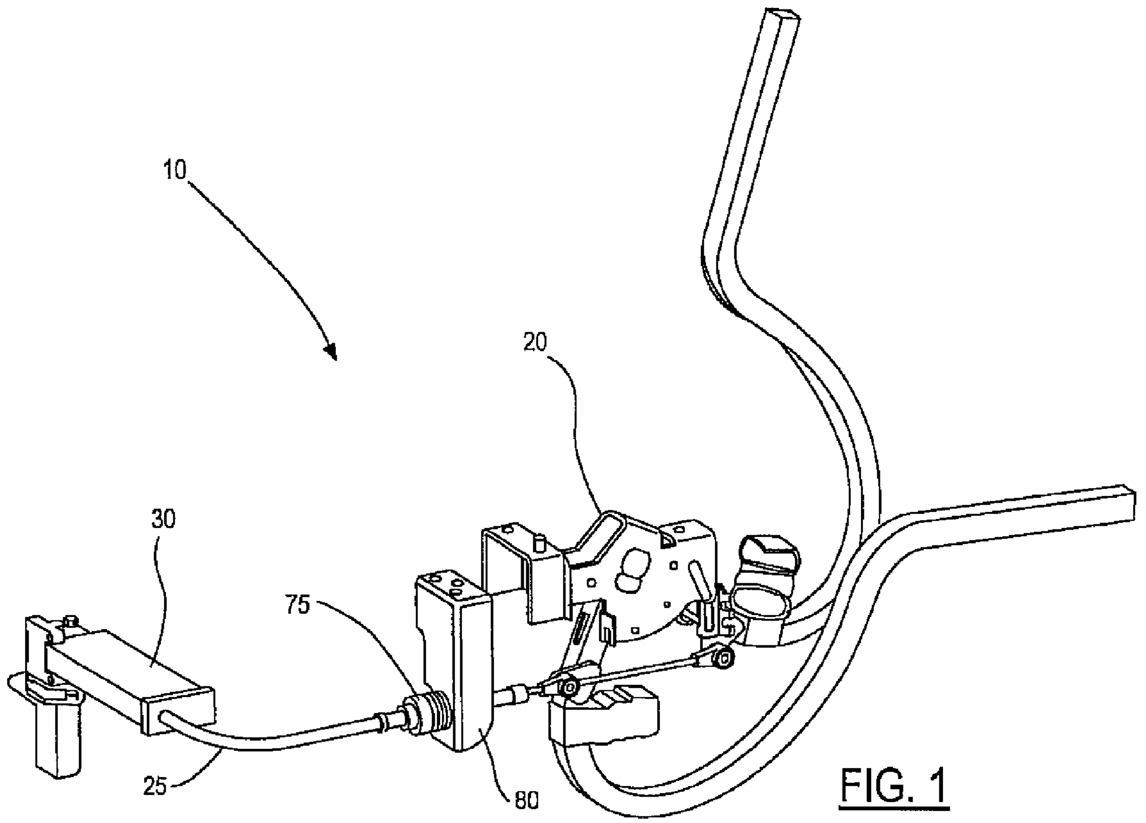
FIG. 1 is a partial perspective view of a powered deck lid assembly showing the hinge mechanism and actuator including a push-pull cable.
Figure 2:
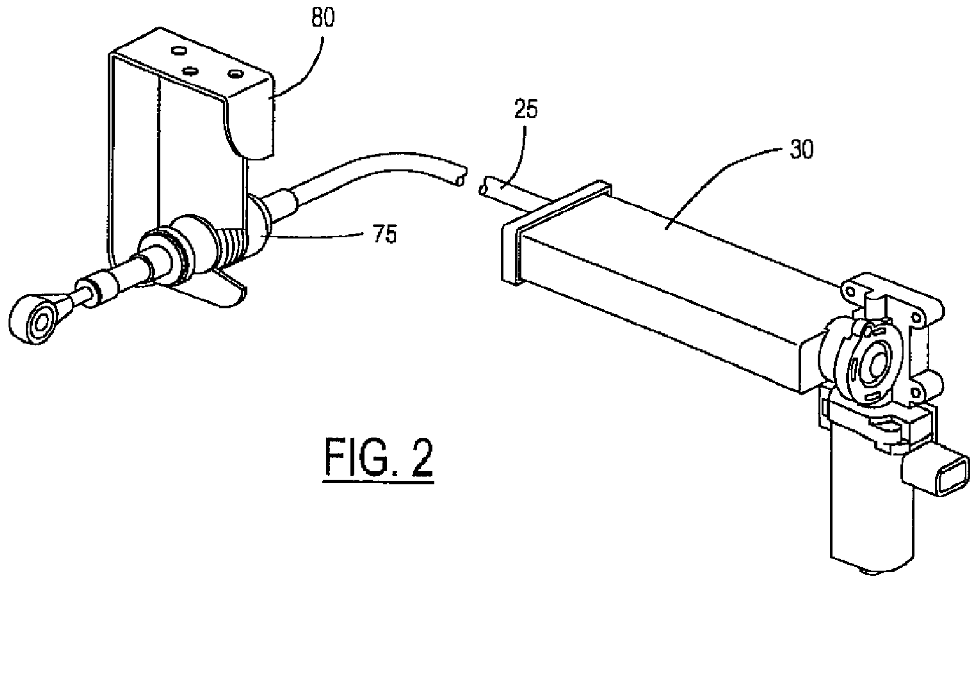
FIG. 2 is a partial perspective view of an actuator and push-pull cable of the powered deck lid assembly.
Figure 3:
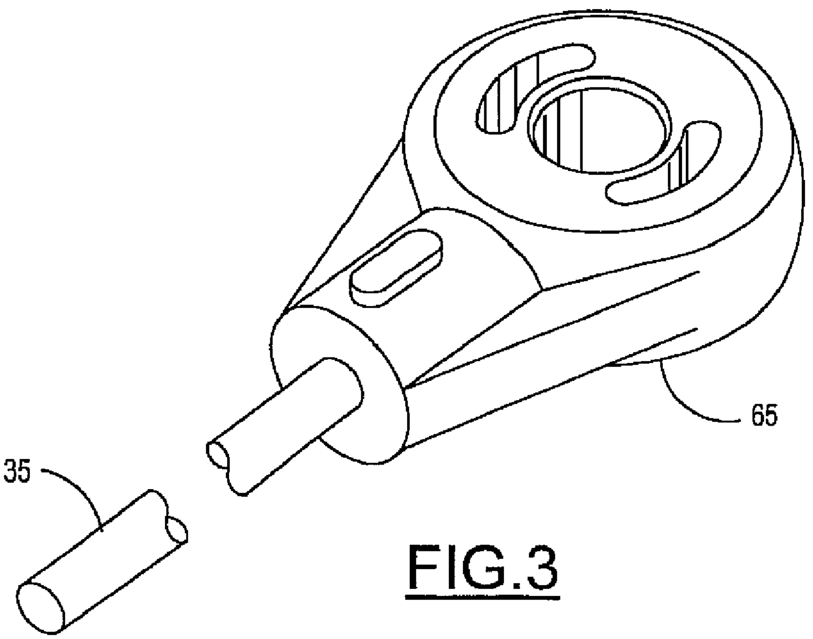
FIG. 3 is a partial perspective view of a push-pull cable detailing the core element and molded head.
Figure 4:
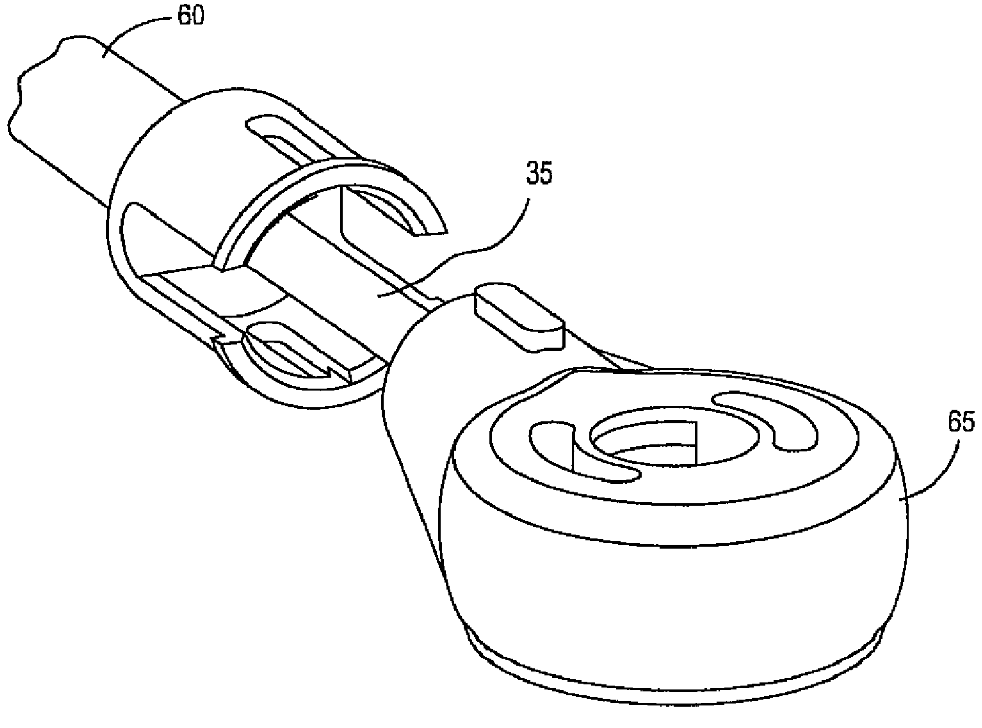
FIG. 4 is a partial perspective view of a push-pull cable including the core element, molded head and slip-on tube.
Figure 5:
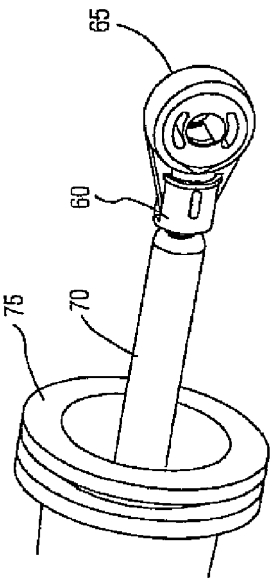
FIG. 5 is a partial perspective view of a push-pull cable including the molded head, slip-on tube, and bevel tube assembled.
Figure 6:
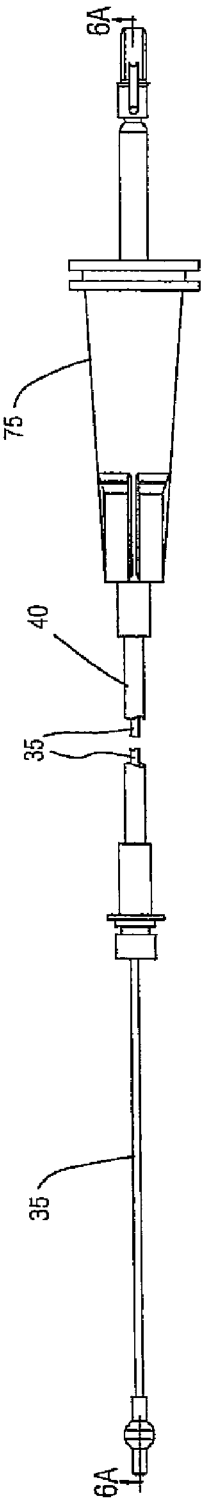
FIG. 6 is views of the push-pull cable including sectional views detailing the core element and conduit and conduit end fitting.
Figure 6A:
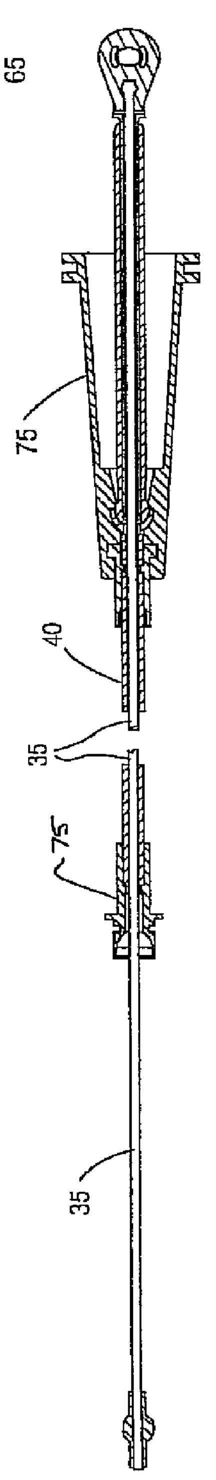
Figure 7:
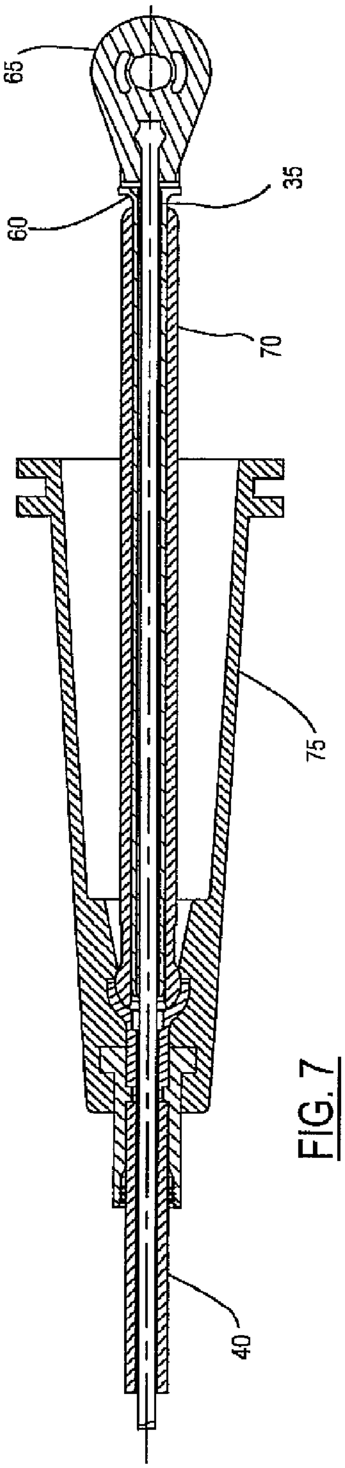
FIG. 7 is a sectional view detailing the core element, slip-on tube, molded head, bevel tube, and the conduit end fitting.
Figure 8:
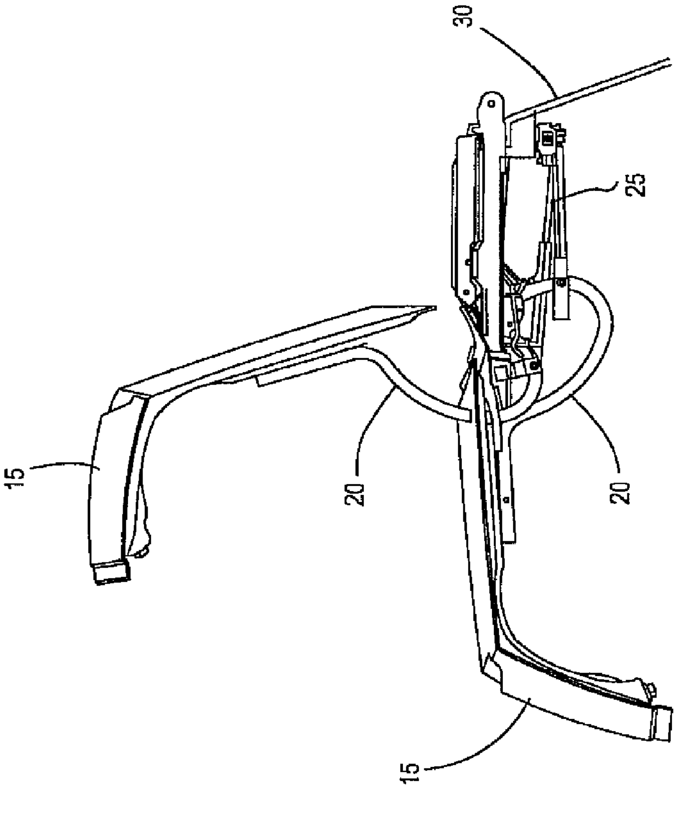
FIG. 8 is a side view taken of the powered deck lid assembly showing the deck lid attached to the hinge mechanism and in the open and closed positions.
Figure 9:
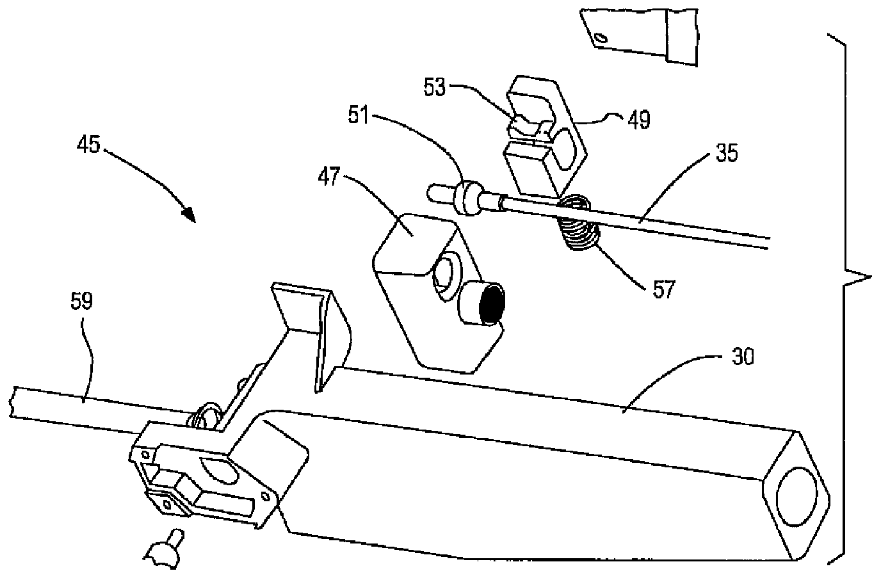
FIG. 9 is a partial exploded perspective view of a decoupling mechanism.
Figure 10:
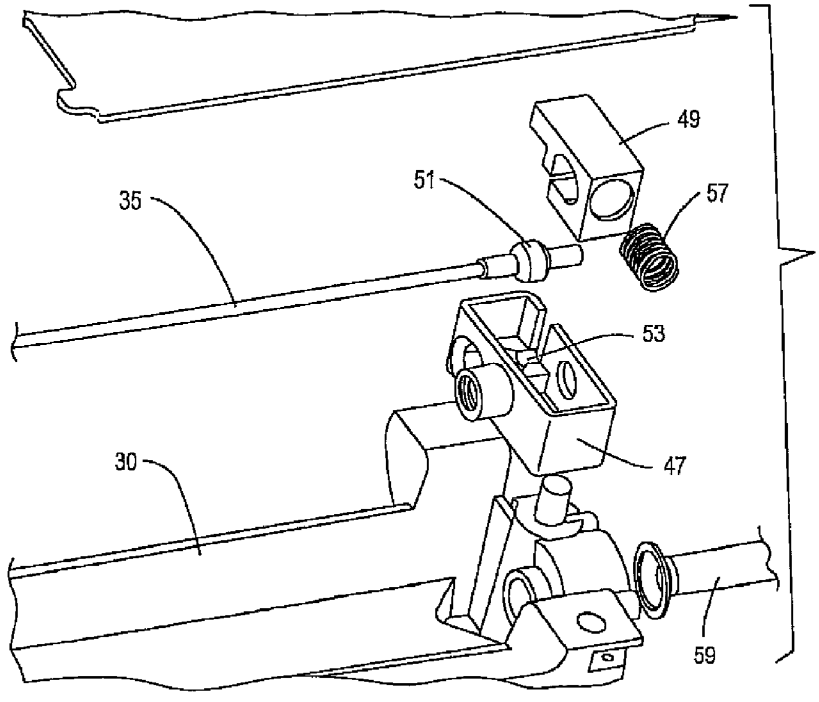
FIG. 10 is a partial exploded perspective view of a decoupling mechanism.
Figure 11:
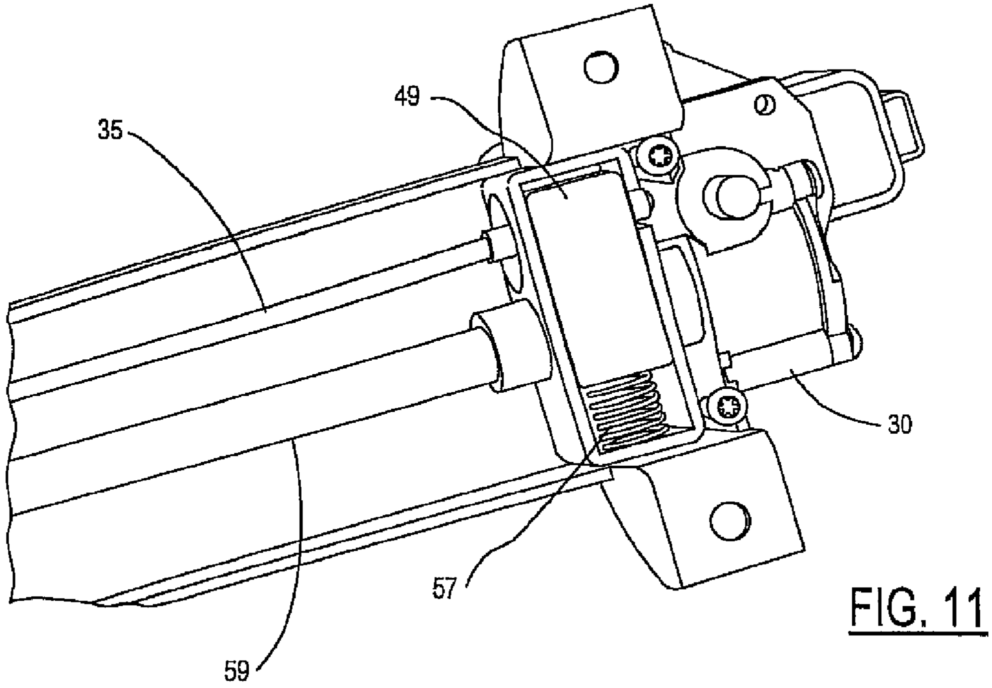
FIG. 11 is a partial assembled perspective view of a decoupling mechanism.
Figure 12:
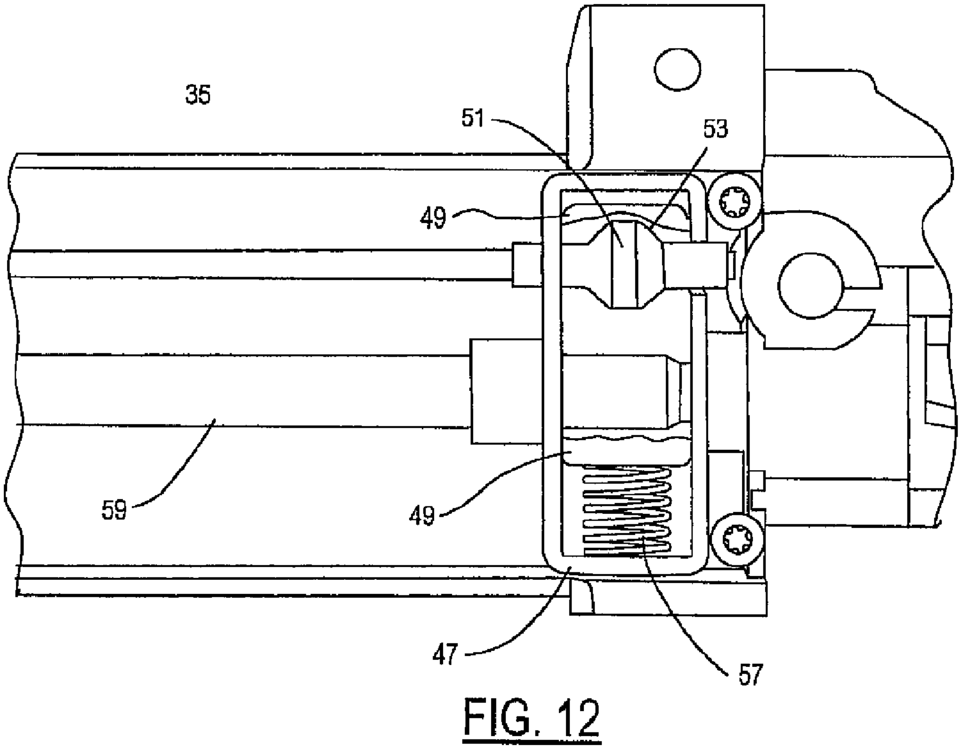
FIG. 12 is a partial perspective view of a decoupling mechanism in an engaged position.
Figure 13:
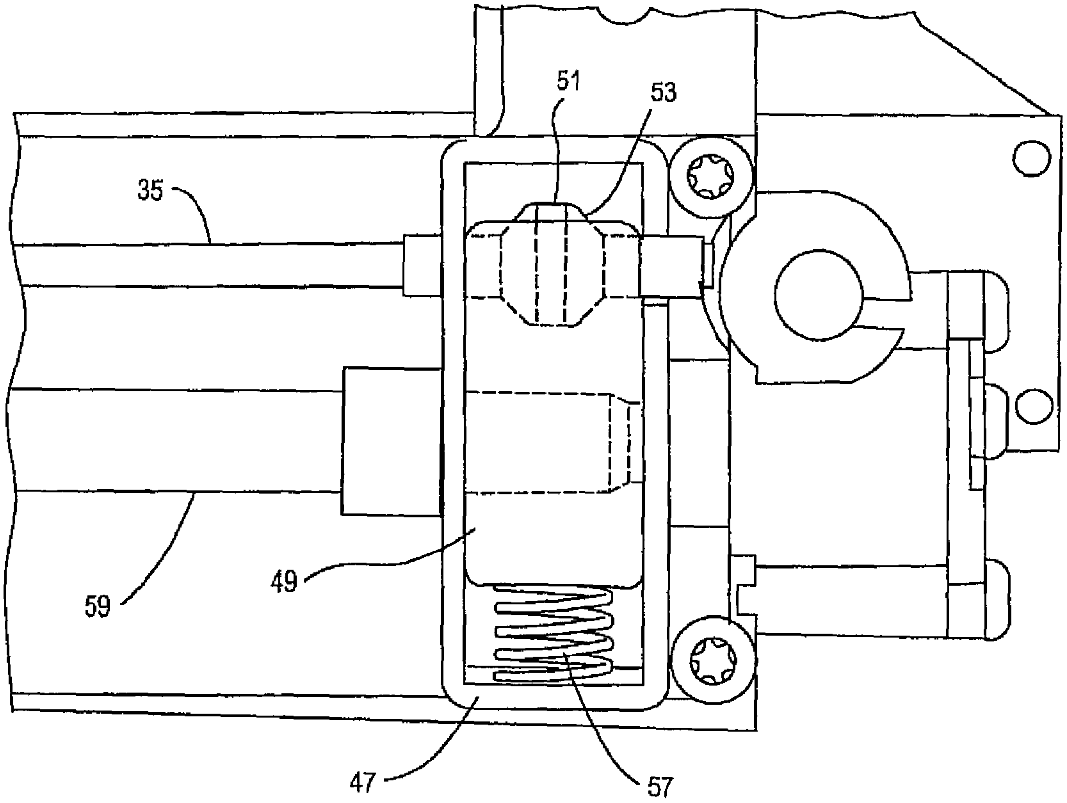
FIG. 13 is a partial perspective view of a decoupling mechanism in an engaged position.

Referring to FIG. 1, there is shown an embodiment of a powered deck lid assembly 10. The powered deck lid assembly 10 includes a deck lid 15, as best seen in FIG. 8, connected to a hinge mechanism 20 for pivotal movement between open and closed positions relative to a trunk opening. A push-pull cable 25 is attached at a first end to the hinge mechanism 20. The push-pull cable 25 is movable lineally to pivotally move the deck lid 15 between the open and closed positions.

The powered deck lid assembly 10 includes an actuator 30 that is attached at a second end of the push-pull cable 25. The actuator 30 may be any type actuator that will move a core element 35 relative to a conduit 40 of the push-pull cable 25.

In one aspect, the hinge mechanism 20 may be a goose neck hinge assembly that includes a torsion bar assist mechanism.

In one aspect, the powered deck lid assembly 10 may include a decoupling mechanism 45 that selectively links the actuator 30 and the second end of the push-pull cable 25 allowing for manual operation of the hinge mechanism 20. In this manner, an operator may close a trunk manually without having to back drive the actuator 30. In one aspect, the decoupling mechanism 45 may be a lead screw clutch associated with the actuator 30

In another aspect as shown in FIGS. 9-13, the decoupling mechanism 45 may include a housing 47 positioned in the actuator 30. The housing 47 receives a retaining block 49 that is releasably coupled to a button 51 on the core element 35. The button 51 is held by the geometry 53 on the retaining block 49 and the housing 47 which mate to hold the button 51. A spring 57 biases the retaining block 49 relative to the housing 47 to center the button 51 in the geometry 53 in an engaged position. When a force is applied to the core element 35 that exceeds a force applied by the actuator 30, the button 51 disengages from the housing 47 and retaining block 49 allowing the housing 47 to travel relative to the lead screw 59 under the manually applied force. To reset the button 51 in the housing 47 and retaining block 49, the actuator 30 moves the housing 47 such that the button 51 is returned to the engaged position relative to the geometry 53 and is held in the geometry 53 of the housing 47 and retaining block 49.

As described above, and as shown in FIGS. 3-7, the push-pull cable 25 may include a core element 35 disposed in a conduit 40. The core element 35 may include end fittings 50 disposed on each end of the core element 35. Additionally, the conduit 40 may include end fittings 55 that are disposed on each end of the conduit 40. The push-pull cable 25 may include a slip-on tube 60 that is disposed about the first end of the core element 35 that is adapted to connect to the hinge mechanism 20. The slip-on tube 60 provides additional rigidity and strength across a travel distance that may range from 110 to 160 mm. Additionally, the first end of the core element 35 may include a head 65 that is adapted to attach to the hinge mechanism 20. A swivel tube 70 may be disposed about the slip-on tube 60 allowing for relative movement of the core element 35, slip-on tube 60, and the head 65 about a conduit end fitting 75. The conduit end fitting 75 may be attached to a bracket 80 that is positioned at the first end of the push-pull cable 25 and that retains the core element 35 and conduit 40 at the first end of the push-pull cable 25. In one aspect, the conduit 40 may absorb forces applied to the deck lid 15 and are transmitted to the push-pull cable 25 thereby lessening an applied force on the actuator 30.

In one aspect, the push-pull cable 25 transmits a pushing force to open the deck lid 15 from a closed position and applies a pulling force closing the deck lid 15 from the open position. In this manner, the cable 25 travels lineally or is lineally actuable to pivotally move the deck lid 15 between the open and closed positions.

In use, and as best shown in FIG. 8, the deck lid 15 may be connected to a hinge mechanism 20 for pivotal movement between open and closed positions relative to a trunk opening. The push-pull cable 25 includes a core element 35 and conduit 40. The push-pull cable 25 is attached at a first end to the hinge mechanism 20 via a molded head 65 that is attached to the core element 35. Additionally a slip-on tube 60 and swivel tube 70 are disposed about the core element 35 proximate the first end of the push-pull cable 25. A bracket 80 is positioned relative to the first end of the push-pull cable 25 and retains a conduit end fitting 75. The conduit 40 may absorb forces that are applied to the deck lid 15 lessening applied force on an actuator 30 coupled at the second end of the push-pull cable 25.

An operator may power or actuate the actuator 30 when the deck lid 15 is in the closed position such that the actuator 30 transmits a pushing force to the core element 35. The core element 35 travels lineally thereby moving the first end of the push-pull cable 25 including the slip-on tube 60 and bevel tube 70 that are applied over the first end of the push-pull cable 25. The lineal motion is transferred to the hinge assembly 20 via the connection or molded head 65 such that the hinge assembly 20 pivots about a pivot point thereby moving the deck lid assembly between the open and closed positions. In one aspect, the cable 25 may travel lineally a distance of from 0 to 150 mm from the closed to the open position.

When an operator wishes to close the deck lid assembly 10, the actuator 30 is powered in an opposite direction such that the actuator 30 applies a pulling force to the core element 35. In this manner, the core element 35 applies a pulling force at the first end of the push-pull cable 25 including the slip-on tube 60 and bevel tube 70 and transmits the force via the molded head 65 connection attached to the hinge assembly 20. The lineal travel of the push-pull cable 25 causes the deck lid 15 and hinge assembly 20 to pivot about a pivot point thereby moving the deck lid 15 between the open and closed positions relative to a trunk opening.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A powered deck lid assembly comprising:

a deck lid connected to a hinge mechanism for pivotal movement between open and closed positions relative to a trunk opening;

a push-pull cable attached at a first end to the hinge mechanism, the push-pull cable including a single core element disposed in a conduit, the single core element transmitting a lineal pushing force to the hinge mechanism to open the deck lid from a closed position and applying a lineal pulling force to the hinge mechanism closing the deck lid from the open position, the powered deck lid assembly including a slip-on tube disposed about the first end of the core element and a swivel tube disposed about the slip-on tube.

2. The powered deck lid assembly of claim 1 including an actuator attached at a second end of the push-pull cable.

3. The powered deck lid assembly of claim 1 wherein the hinge mechanism comprises a goose neck hinge assembly.

4. The powered deck lid assembly of claim 3 wherein the goose neck hinge assembly includes a torsion bar assist mechanism.

5. The powered deck lid assembly of claim 2 including a decoupling mechanism selectively linking the actuator and the second end of the cable for manual operation of the hinge mechanism.

6. The powered deck lid assembly of claim 5 wherein the decoupling mechanism comprises a housing and retaining block having a geometry that retains a button at the second end of the cable, the button moveable to engage and disengage relative to the geometry for manually actuating the powered deck lid assembly.

7. The powered deck lid assembly of claim 1 wherein the conduit includes end fittings disposed on each end of the conduit.

8. The powered deck lid assembly of claim 1 wherein the first end of the core element includes a head adapted to attach to the hinge assembly.

9. The powered deck lid assembly of claim 1 including a bracket positioned at the first end of the push-pull cable, the bracket retaining a conduit fitting.

10. The powered deck lid assembly of claim 1 wherein the conduit absorbs forces applied to the deck lid and transmitted to the push-pull cable lessening an applied force on the actuator from the forces applied to the deck lid.

11. The powered deck lid assembly of claim 1 wherein the cable travels lineally a distance of from 0 to 150 mm from the closed to the open position.

* * * * *